No. 609,554. Patented Aug. 23, 1898.
C. R. MARTIN & L. A. SPINELLI.
AUTOMATIC PRESSURE EQUALIZING BEER FAUCET.
(Application filed Nov. 4, 1897.)
(No Model.)
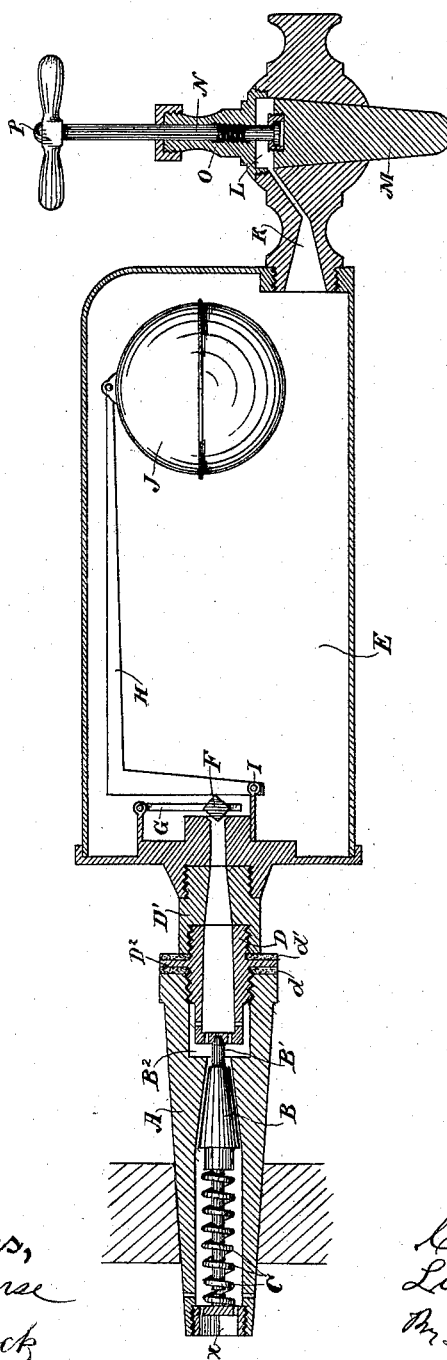
Witnesses,
Inventors,
Carlos R. Martin
Luigi A. Spinelli
By Dewey & Co.
Attys
THE NORRIS PETERS CO., PHOTO-LITHO., WASHINGTON, D. C.

UNITED STATES PATENT OFFICE.

CARLOS RUEZ MARTIN AND LUIGI A. SPINELLI, OF SAN JOSÉ, CALIFORNIA.

AUTOMATIC PRESSURE-EQUALIZING BEER-FAUCET.

SPECIFICATION forming part of Letters Patent No. 609,554, dated August 23, 1898.

Application filed November 4, 1897. Serial No. 657,324. (No model.)

*To all whom it may concern:*

Be it known that we, CARLOS RUEZ MARTIN and LUIGI A. SPINELLI, citizens of the United States, residing at San José, county of Santa Clara, State of California, have invented an Improvement in Automatic Pressure-Equalizing Beer-Faucets; and we hereby declare the following to be a full, clear, and exact description of the same.

Our invention relates to an improved device for drawing beer.

It consists in the parts and the constructions and combinations of parts hereinafter described and claimed.

The figure is a longitudinal section showing my apparatus.

The objects of this invention are to provide a faucet by which beer or other effervescent liquid in which a considerable quantity of carbonic acid has been absorbed by pressure within a containing-receptacle may be drawn in a comparatively solid condition and without a great mass of foam or froth caused by the escape of gas from the liquid when the pressure is relieved, and to so regulate the pressure by an automatically-operating mechanism that the gas-pressure can be retained within the cask or receptacle until the liquid has all been withdrawn, while a reduced pressure is maintained in connection with the drawing-faucet.

A is a hollow stem or bushing adapted to be fitted into the cask or receptacle containing the liquid to be drawn. This bushing may be tapered so as to be driven in, or it may be adapted to screw or lock or be secured by any of the usual and well-known means. At the inner end of the opening of this stem is fitted a screw-threaded plug $a$, having a square socket by which it may be screwed in or out. Through the bottom of the socket are holes which will allow the contents of the cask to flow into the passage within the stem A, and similar holes may be made in the sides of the stem, if desired. Toward the opposite and outer end of the stem the passage is tapered to receive a correspondingly-tapered valve B, and this valve is normally held closed outwardly against its seat by the pressure of the liquid from the interior, as well as by the pressure of spiral spring C, which lies within the passage interior to the stem A. The outer end of the valve has a projection or lug B', which extends into an enlarged chamber $B^2$ within the outer end of the hollow stem.

D is a screw-threaded coupling by which connection is made between the stem and the expansion-chamber, which is interposed between this stem and the faucet proper. The outer end of the coupling D screws into the connection D', which unites with the enlarged chamber E and is permanently connected therewith. The inner end engages with screw-threads in the outer end of the stem A and is thus screwed in and connected therewith. This coupling D is here shown with an annular flange $D^2$, and by means of washers $d$ and $d'$, resting against opposite sides of this flange, a tight joint is made between the stem A and the connection D' when the parts are screwed together.

The inner end of the coupling D is adapted to engage with the projection B' of the valve B when the coupling D is screwed down to its seat, and this forces the valve B back against the pressure of the spring C and the gas-pressure from the interior of the cask, so that the beer will be allowed to flow through the elongated annular channel formed between the valve B and its seat. The beer entering the chamber $B^2$ flows thence through openings made in the sides and inner end of the coupling D to its hollow interior, thence passing through the connection D' it enters the chamber E. The chamber E is of sufficient size to allow a considerable quantity of liquid flowing into it, where the gas has an opportunity to separate from it, and the liquid can then be drawn from the chamber E through the discharge-faucet under a reduced pressure and such conditions as will, while leaving it perfectly sharp, prevent too great an escape of gas with the liquid.

In order to regulate the flow of the liquid from the cask through the connection B' into the chamber E, we have shown a valve-seat formed at the end of the passage opening from D' into the chamber E, and in conjunction with this seat is a valve F, adapted to close against it and cut off all communication with the cask. This valve is suspended by a swinging arm G or otherwise suitably guided, so as to move in line with the seat and the passage, which it closes. The present construction shows a swinging arm.

H is a lever fulcrumed to any suitable support, as shown at I, which is at the lower end of the approximately vertical portion of the lever-arm. From the upper end this lever-arm H extends horizontally along within the chamber E and carries at its extremity a float J. This float, resting in the liquid contained within the chamber E, rises and falls as the body of liquid increases or decreases. When the amount increases, so that there is as much liquid within the chamber E as is desirable, the raising of the float tilts the latter about its fulcrum-point I, and this, acting against the stem or projection from the valve F, serves to close it against the inlet-passage and prevent any further introduction of beer into the chamber until some has been drawn out and the float allowed to sink far enough to again open the valve F. By this construction a proper amount of beer is always retained within the chamber E and the supply is automatically regulated. The discharge from the chamber E takes place through a passage K, opening from the lower part of the chamber E and discharging into the upper part L of the faucet proper. This chamber is made tapering, as shown, and within it fits the tapering plug or valve M, which forms an elongated seat against which the valve closes to prevent the discharge of liquid. The upper end of the valve has connected with it a swivel-stem N, extending through a screw-threaded cap O, so that by turning the cock or handle P upon the outside the valve or plug M may be opened or closed, the raising of the valve forming an annular channel around it to allow the discharge of the liquid.

Every reduction of the liquid within the chamber E caused by drawing from the valve M will move the float J, so as to allow the valve F to open and a new supply to enter, and this will continue until the cask or receptacle is entirely empty, while a sufficient gas-pressure remains to keep the liquid always sharp and palatable.

Having thus described our invention, what we claim as new, and desire to secure by Letters Patent, is—

1. In a faucet for drawing effervescent liquids, the combination, of a substantially horizontally-disposed expansion-chamber, having at one end a draw-off faucet, a lever, fulcrumed at one end within the chamber and having a float at its opposite end, a valve, pivotally suspended from above and interposed between an arm of the lever and the inlet to the chamber, a hollow stem, extending in line with the chamber, having one end to be fitted directly to the cask and having the opposite end internally chambered, a hollow coupling connecting said internal chamber with the expansion-chamber, a tapering spring-pressed valve in the stem between said internal chamber and the inner end, adapted to seat against a corresponding seat and having an extension to be directly engaged by the said coupling whereby the valve is unseated.

2. In a faucet for drawing effervescent liquids, the combination, of an expansion-chamber, having at one end a hollow stem adapted to be directly connected with the cask or receptacle, and at the opposite end a draw-off faucet, a valve in said chamber, having a stem pivotally suspended from above, said valve controlling the passage leading from the cask to the expansion-chamber, and adapted to be opened by the pressure from within the cask, and a bent lever, fulcrumed at one end of its vertical arm and having a float connected with the outer end of its horizontal arm, said vertical arm serving to control the opening and closing of the valve.

3. In a device for drawing effervescent liquid, a hollow stem forming direct communication with the cask or receptacle containing the liquid having an elongated tapering spring-pressed valve closing outwardly from a corresponding seat within the stem, an enlarged chamber exterior to the valve and a lug projecting from the outer end of the valve into said chamber, an expansion-chamber having a coupling by which it is connected with the hollow stem, said coupling screwing therein with its inner end perforated and forming a contact with the lug upon the valve whereby the latter is forced backward and an annular passage formed around it for the escape of the liquid, a second valve closable against the seat through which the liquid enters the expansion-chamber, a lever fulcrumed with relation to said valve carrying a float upon its outer end so that the increase of liquid within the expansion-chamber will raise the float and close the valve and its decrease will allow the valve to open, and a draw-off faucet connecting with the end of the expansion-chamber opposite to the inlet-passage.

In witness whereof we have hereunto set our hands.

CARLOS RUEZ MARTIN.
LUIGI A. SPINELLI.

Witnesses:
H. A. GABRIEL,
J. E. O'CONNOR.